July 26, 1960     K. A. GERLACH ET AL     2,946,924
CAPACITOR DISCHARGE CIRCUIT
Filed April 13, 1959
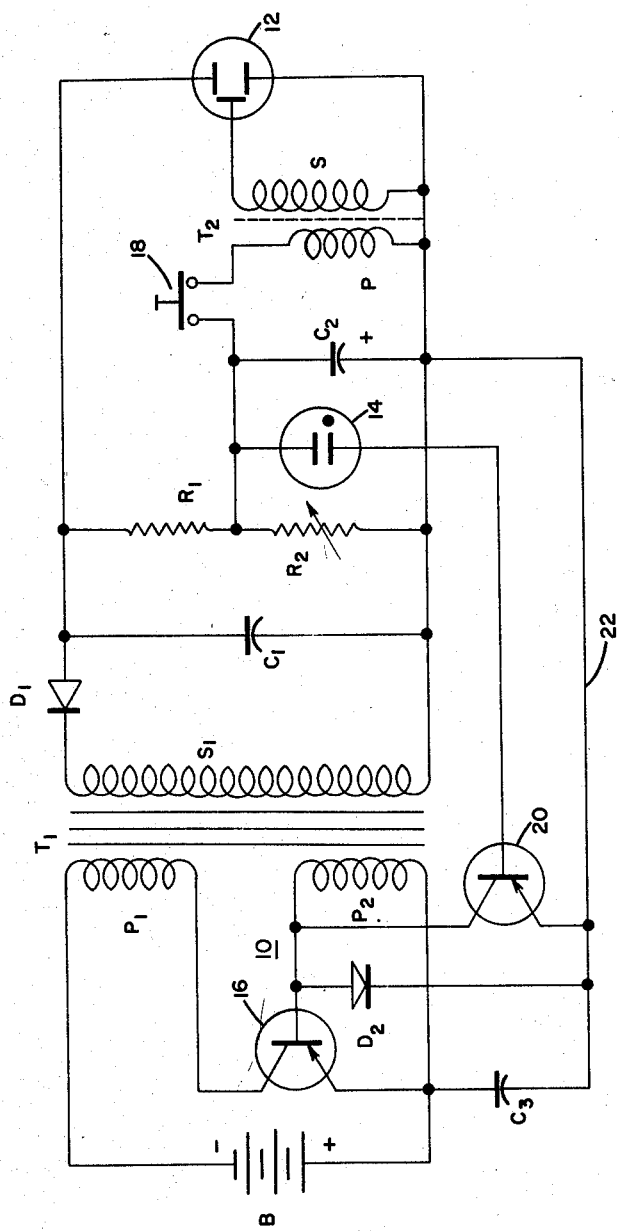
INVENTORS.
KARL ALBRECHT GERLACH
KURT WITTIG
BY
ATTORNEY

United States Patent Office 2,946,924
Patented July 26, 1960

2,946,924
CAPACITOR DISCHARGE CIRCUIT

Karl Albrecht Gerlach, Dusseldorf, and Kurt Wittig, Lubeck-Kucknitz, Germany, assignors to Clevite Corporation, Cleveland, Ohio, a corporation of Ohio Filed Apr. 13, 1959, Ser. No. 806,151

6 Claims. (Cl. 315—241)

This invention relates to electronic circuits for controlling the charging process for a capacitor and, particularly, to the application of such circuits to electronic flash equipment used in photography.

Flash equipment of the general type to which the invention pertains is well-known and commercially available. Such equipment, conventionally, employs a circuit embodying a storage capacitor which is charged when the circuit is completed (i.e., when the unit is switched on) and which discharges through a gaseous discharge tube. Customarily, the circuit includes a gas-filled cold cathode tube or "glow lamp" which goes on when the storage capacitor is charged, indicating that the equipment is ready for operation.

The charging time of the capacitor, i.e., the interval between the previous flash or the switching on of the equipment to the time when the glow lamp signals readiness varies with the type of equipment. Usually this interval is between 4 and 14 seconds.

When the equipment is ready for use, it remains in this condition until the photographer has completed his camera settings, posing his subject, etc., during which time it is inconvenient for him to switch off the equipment and, as a matter of general practice, this is rarely done. Consequently, the equipment continues to consume power and deplete the batteries. The waiting time usually amounts to a minute or more and drastically reduces the efficiency of the equipment as will now be explained. The energy supplied to the circuit is consumed for two functions: (1) charging the storage capacitor and (2) maintaining the charged and ready condition, which involves replacement of insulation losses and supply of power to the indicator (glow) lamp.

Prior to the advent of transistors, the first function customarily was performed by electromechanical vibrators which characteristically have relatively good efficiency, e.g., about 35%. The second function, however, consumes many times more power than the first because the efficiency of the vibrator at no load drops to about 5%. On the basis of the ratio of typical charging and waiting times as mentioned above, the overall efficiency is only about 12%.

For the past several years, transistor vibrators have been replacing electromechanical vibrators in voltage-transforming circuits and more recently, in electronic photographic flash equipment. While the transistorization of flash equipment has resulted in the typical benefits, e.g., smaller size, lighter weight, increased impact resistance and higher efficiency, the empty-run power consumption of the vibrator is still considerable.

Another disadvantage of even the transistorized conventional electronic flash equipment is variation in flash intensity which comes about in the following manner. The time required to charge the storage capacitor to 80% of its capacity is approximately the same required to charge from 80% to 96%. In order to avoid too long a nominal charging time, the circuit is designed so that the readiness indicator light goes on when the capacitor reaches some point between 80 and 90% of capacity. Consequently, if the flash is discharged as soon as the indicator lamp comes on, the energy of the flash may be only about ⅔ of that attained when discharge occurs a minute or so after the indicator lamps go on. With the great exposure latitude of modern black and white film, the difference in flash intensity is of little consequence. This is not the case, however, with color film where lighting is critical and affects not only the density of the transparency but the color rendition as well.

It is the fundamental object of the present invention to overcome at least one of the disadvantages of the prior art as outlined above.

A more specific object is the provision of novel circuits of improved efficiency for the charging and control of the charging process of a capacitor.

Another object is the provision of a novel circuit for electronic flash equipment using a transistor vibrator power supply wherein the power supply is automatically turned off when the capacitor is charged.

Still another object is the provision of a novel circuit for electronic flash equipment which produces flashes of substantially uniform intensity.

These and further objects are accomplished by circuits according to the present invention which include a power source, a high energy storage capacitor, a transistor vibrator network for charging the storage capacitor from said power source, and circuit means responsive to the voltage on the storage capacitor for rendering the vibrator inactive after the capacitor is charged to a predetermined voltage.

Additional objects of the invention, its advantages, scope and the manner in which it may be practiced will be apparent to those conversant with the art from the following description and subjoined claims in conjunction with the annexed drawing, in which the single figure is a wiring diagram of an electronic flash circuit embodying the invention.

Referring to the drawing, the circuit embodies a conventional transistor vibrator and voltage multiplier 10 for stepping up the voltage supplied by a D.-C. power source such as battery B; a gaseous discharge tube or "flash" lamp 12; a storage capacitor $C_1$ for firing flash lamp 12; and a gas filled cold cathode tube or "glow lamp" 14 connected to ignite when $C_1$ reaches a predetermined voltage. Vibrator-multiplier 10 comprises a power transistor 16; a transformer $T_1$ having two primary windings $P_1$ and $P_2$ inductively coupled to a secondary winding $S_1$; and a diode $D_1$ in series with the second winding. Primary winding $P_1$ and battery B are serially connected in the emitter-collector loop of transistor 16 and winding $P_2$ is connected between the emitter and base electrodes of this transistor. The circuitry thus far described is a more or less conventional transistor vibrator. The energy supplied by battery B, by virtue of oscillations in the primary winding of transformer $T_1$, appears as A.-C. in the secondary winding $S_1$, a portion of the A.-C. being inductively fed back to maintain oscillation.

Storage capacitor $C_1$, flash lamp 12 and a voltage divider consisting of serially connected fixed and variable resistors $R_1$ and $R_2$, respectively, are connected in parallel across the secondary winding $S_1$ of transformer $T_1$ through diode $D_1$.

A transformer $T_2$ has its primary winding P connected through a push button switch 18, between the lower end of winding $S_1$ and the center tap of voltage divider $R_1$—$R_2$. Shunted across winding P of transformer $T_2$ is a capacitor $C_2$.

The secondary winding S of transformer $T_2$ is connected at one end to the control electrode of flash tube 12.

A capacitor $C_2$ is shunt-connected across the branch $R_2$ of voltage divider $R_1$—$R_2$.

In accordance with the present invention a control transistor 20 is provided for damping out the oscillations of power transistor 16 when indicator lamp 14 lights up. To this end the base electrode of transistor 20 is connected to one electrode of glow lamp 14 the other electrode of which is connected to the center tap of voltage divider $R_1$—$R_2$. The collector of control transistor 20 is connected to the base of power transistor 16 and the emitter of these transistors are connected to opposite terminals of a capacitor $C_3$. A diode $D_2$ is shunted across the emitter-collector circuit of transistor 20. A conductor 22 interconnects one terminal of capacitor $C_3$ and the emitter of transistor 20 with the corresponding polarity terminals of capacitors $C_1$ and $C_2$ as well as with the lower end of voltage divider $R_1$—$R_2$ and transformer windings $S_1$, P and S.

The operation of the Figure 1 circuit is as follows: storage capacitor $C_1$ is charged in the conventional manner by the operation of vibrator 10. When a predetermined voltage is accumulated, glow lamp 14 lights and becomes conductive whereupon capacitor $C_2$ discharges causing a surge of current which biases control transistor 20 to conduction, thus shorting the emitter-base circuit of power transistor 16, terminating the oscillation of vibrator 10. Then a current flows through lamp 14, determined by voltage divider $R_1$—$R_2$, sufficient to maintain power transistor 20 cut-off.

When the voltage of capacitor $C_1$ has dropped a predetermined amount (for example about 2%, which might require about 20 seconds) glow lamp 14 shuts off and the vibrator momentarily resumes operation recharging $C_1$ to its rated voltage. In a practical embodiment this recharge takes about 0.2 second. Thereupon indicator lamp 14 ignites and conducts once again and the process repeats.

At any time the capacitor is charged, flash lamp 12 may be fired by pressing button 18, usually synchronously coupled with the camera shutter, not shown.

The function of capacitor $C_3$ is to insure that vibrator 10 is cut off and to prevent counter-oscillation. Capacitor $C_3$ is charged through diode $D_2$ by feedback of A.-C. during operation of the vibrator. When lamp 14 ignites, capacitor $C_3$ discharges applying to emitter of control transistor 20 a forward bias potential and to the emitter of power transistor 16, a reverse bias potential, thus insuring positive cut-off. Capacitor $C_3$ is recharged when vibrator 10 becomes operative.

By inclusion of capacitor $C_3$ (and its charging diode $D_2$) operation of the vibrator cut-off is rendered substantially independent of variations in power supply and operation of control transistor 20.

With this arrangement, the after-charging (i.e., replacement or maintenance charging) is characterized with the same good efficiency (e.g., 35–50%) as the initial charging.

The operation of the circuit can be further improved, particularly for high temperature operation by connecting an auxiliary battery (not shown) across capacitor $C_3$ so that the cut-off bias potentials on the transistor emitters are maintained during the entire interval when the vibrator 10 is off. Without such an auxiliary battery, capacitor $C_3$ is discharged completely in shutting off the vibrator so that the cut-off bias is not maintained during the relatively long period that the vibrator is inoperative. At normal temperatures, power transistor 16 is effectively cut-off and vibrator 10 remains inoperative. However, depending on the particular transistors and their $I_{co}$ values, the damping can be critical, especially at higher temperatures. The higher the temperature, the more easily power transistor 16 oscillates and, should oscillation resume even with lamp 14 conducting, this could lead to overcharging of capacitor $C_1$. This possibility is effectively precluded by use of the auxiliary battery.

While an illustrative circuit in accordance with the invention has been described specifically, it will be understood then many variations may be resorted to as necessary or desired. For example, in addition to control transistor 20 connected as shown and described above, a second control transistor can be inserted as a switch in the base connection of power transistor 16 and controlled by the first control transistor so as to block this base connection when the indicator lamp is conducting.

From the foregoing description it will be appreciated that, in circuits according to the present invention, the final voltage of storage capacitor $C_1$ depends solely on the conduction voltage of glow lamp 14 and is independent of such variables as the condition of the battery, the quality of other circuit components, etc. Moreover, the need for providing measures, for example, various transfer taps, for compensating the modulus distribution of the transistor, are eliminated. One of the paramount advantages, however, is that the power drain during readiness intervals is only a fraction of that in conventional equipment, thus conserving the power supply battery.

While there have been described what at present are believed to be the preferred embodiments of this invention, it will be obvious to those skilled in the art that various changes and modifications may be made therein without departing from the invention, and it is aimed, therefore, to cover in the appended claims all such changes and modifications as fall within the true spirit and scope of the invention.

We claim:

1. An electrical circuit comprising, in combination: a storage capacitor; a transistor vibrator for charging said capacitor from a source of D.-C. potential; a control transistor connected to render said vibrator inoperative when said control transistor is biased to conduction; and a circuit element, conductive upon the application thereto of a predetermined potential, connected to render said control transistor conductive in response to the existence of a predetermined voltage on said capacitor.

2. An electrical circuit comprising: a storage capacitor; a power transistor vibrator and voltage multiplier network for charging said capacitor from a source of D.-C. potential; a control transistor connected between two terminals of said power transistor and adapted, when conductive, to short-circuit said terminals; a glow lamp adapted to conduct upon application thereto of a predetermined voltage; and circuit connections for biasing said control transistor to conduction in response to a predetermined voltage on said capacitor.

3. An electrical circuit comprising: a transformer having two primary windings and a secondary winding; a power transistor triode having an emitter, base, and collector electrode connected in circuit to form a power supply loop including, in series, one of said primary windings and a feedback loop including, in series, the other of said primary windings; a storage capacitor and a diode connected in series across said secondary winding; a control transistor connected to short-circuit said feedback loop when biased to conduction; and a glow lamp coupled between said control transistor and said storage capacitor and adapted to conduct, upon the attainment of a predetermined voltage across said storage capacitor, and apply to said control transistor a bias potential rendering said control transistor conductive.

4. An electrical circuit comprising: a transformer having two primary windings and a secondary winding; a power transistor triode having an emitter, base, and collector electrode connected in circuit to form a power supply loop including, in series, one of said primary windings and a feedback loop including, in series, the other of said primary windings; a storage capacitor and a diode connected in series across said secondary winding; a control transistor having a collector connected to short-circuit said feedback loop when biased to conduction; a glow lamp coupled between said control transistor and said storage capacitor and adapted to conduct, upon the attainment of a predetermined voltage across said storage capacitor, and apply to said control transistor a bias potential rendering said control transistor conductive; and a second capacitor coupled between said power transistor and said control transistor and adapted, upon conduction of said glow lamp, to apply a cut-off bias to said power transistor.

5. An electrical circuit comprising: a transformer having two primary windings and a secondary winding; a power transistor triode having an emitter, base, and collector electrode connected in a common emitter configuration with one of said primary windings in the emitter-base loop and the other in the emitter-collector loop; a storage capacitor and a diode connected in series across said secondary winding; a voltage divider connected in parallel with said storage capacitor across said secondary winding; a control transistor having a collector electrode connected to the base of said power transistor, an emitter electrode, and a base electrode; a glow lamp connected between the common point of said voltage divider and the base electrode of said control transistor; a second capacitor coupling the respective emitters of said control and power transistors; a diode connected in series with said second capacitor between the base and emitter electrodes of said power transistor; a third capacitor connected between one end of said secondary winding and said common point of the voltage divider; conductor means connecting the emitter of said control transistor to said one end of said secondary winding; a flash lamp connected across said secondary winding and having a control electrode; a second transformer having a primary winding and a secondary winding each having one end connected to said one end of the secondary winding of said first mentioned transformer, the other ends of said primary and secondary windings of said second transformer being connected, respectively, to said common point of the voltage divider and the control electrode of said flash lamp; and a normally open switch between said common point and said other end of the primary winding of said second transformer.

6. An electrical circuit according to claim 5 including a source of D.-C. bias potential shunt-connected across said second capacitor and adapted to supply reverse bias to the emitter of the power transistor and forward bias to the emitter of the control transistor.

References Cited in the file of this patent
UNITED STATES PATENTS
2,901,671    Most  ----------------- Aug. 25, 1959

Disclaimer 2,946,924.—*Karl Albrecht Gerlach*, Dusseldorf, and *Kurt Wittig*, Lubeck-Kucknitz, Germany. CAPACITOR DISCHARGE CIRCUIT. Patent dated July 26, 1960. Disclaimer filed Mar. 2, 1964, by the assignee, *Clevite Corporation*.

Hereby enters this disclaimer to claims 2, 3 and 4 of said patent.
[*Official Gazette May 26, 1964.*]